US005721301A

United States Patent [19]

Takigawa

[11] Patent Number: 5,721,301
[45] Date of Patent: Feb. 24, 1998

[54] COATING SOLUTION CONTAINING SILICONE OIL AND POLYMETHACRYLATE

[76] Inventor: Bin Takigawa, 1-48-7 Sakuragaoka, Tama-shi, Japan

[21] Appl. No.: 634,944

[22] Filed: Apr. 19, 1996

[30] Foreign Application Priority Data

Apr. 20, 1995 [JP] Japan .................................. 7-094069

[51] Int. Cl.⁶ .................................................. C08K 5/54
[52] U.S. Cl. .................... 524/267; 524/261; 524/264
[58] Field of Search ................................ 524/261, 264, 524/267

[56] References Cited

FOREIGN PATENT DOCUMENTS

| 4265284 | 9/1982 | Japan . |
| 2214792 | 8/1990 | Japan . |
| 3207800 | 9/1991 | Japan . |
| 3227383 | 10/1991 | Japan . |
| 4342782 | 11/1992 | Japan . |
| 5112583 | 5/1993 | Japan . |
| 5311158 | 11/1993 | Japan . |

OTHER PUBLICATIONS

"Silicon and Silicones", E.G. Rechow, Springer–Verlag, Tokyo, Japan, 1990, pp. 87–89, 94–95.

"Organic Chemistry Practice", Hiroshi Minato, 1978, p. 19.

"Practice of Organic Chemistry", Akira Sugimori, Science Company, 1994, pp. 38–40, 64.

*Primary Examiner*—Edward J. Cain
*Attorney, Agent, or Firm*—Adams & Wilks

[57] ABSTRACT

A coating solution is made from an ingredient solute comprised of silicone oil and polymethacrylicacidalkyl, a basic solvent selected from a group consisting of turpentine oil, heptane, n-decane, tetrachloroethane, 2-butanone, 1.4 dioxane, ethoxyethanol and toluene, and a buffer solvent selected from a group consisting of methanol, aceticacidalkyl and tetrachloromethane. The buffer solvent is added to a mixture of the ingredient solute and the basic solvent so that both of the silicone oil and the polymethacrylicacidalkyl can be perfectly dissolved to form a uniform and clear solution.

16 Claims, No Drawings

COATING SOLUTION CONTAINING SILICONE OIL AND POLYMETHACRYLATE

BACKGROUND OF THE INVENTION

The present invention relates to a coating solution which has good performance as a water repellant (water proof agent) or a polishing agent for fabric products such as cloth and paper, leather products and artificial porcelain products, and which is readily produced by mixing a silicone oil and a polymethacrylicacidalkyl (or polymethacrylate).

In general, the conventional coating composition usable as the water proof agent and the polishing agent has a main component selected from either of polymethacrylicacidalkyl derivatives and silicon compound derivatives. Preferably, the silicon compound may have a structure in which a functional term is introduced into a main methylsilicon chain. The recent prior art is briefly discussed below.

Japanese patent application Laid-open No. 2-214792 discloses a water/oil repellent agent which is a mixture of a water/oil repellant compound having a perfluoroalkyl radical, and a copolymer compound made of two indispensable monomers, i.e., a vinyl monomer having a polyorganosiloxane chain and another vinyl monomer having an isocyanate base or blocked isocyanate base. The disclosed repellant agent features good touching softness and good durability. However, the disclosed material is substantially different from the inventive material.

Japanese patent application Laid-open No. 3-207800 discloses a hydrophobic agent for leather and fur products, which contains two components a and b dissolved or dispersed in an aqueous solution in an at least partially neutralized form. The component a is a compound or mixture selected from $C_n$-alkylacrylate (n=8–40) and $C_n$-carboxylic acid vinylester (n=8–40). The component b is a copolymer having a molecular weight in the order of 500 g/Mol—30,000 g/Mol and being polymerized from monomers selected from monoester or monoamide of monoethylenic unsaturated $C_n$-carboxylic acid (n=3–12), unsaturated dicarboxylic acid unhydrate and monoethylenic unsaturated $C_n$-monocarboxylic acid (n=4–12), and monoethylenic unsaturated $C_n$-monocarboxylic acetamide (n=3–12). A mixture of these monomers is also useable. The component a is an acrylate compound adopted in the inventive material. However, the component a is a symmetric compound relative to the component b which is the copolymer of the monoethylenic unsaturated carboxylic acid ester or the monoethylenic unsaturated carboxylic acetamide. Further, the disclosed material is used in the form of an aqueous solution or dispersion. On the other hand, the inventive composition is applied in the form of an organic solution.

Japanese patent application Laid-open No. 3-227383 discloses a water repellant polishing agent for coating of car body, which contains 0.5–15.0 wt % of fluoroorganosiloxane containing 0.1–36.5 wt % of fluorine, and 0.5–20.0 wt % of dispersed wax or wax-like material. However, the inventive composition contains a simple compound of organosiloxane free of fluorine in contrast to the disclosed fluoric organosiloxane. Further, the disclosed composition is used in the form of emulsion which is different from the inventive agent.

Japanese patent application Laid-open No. 4-265284 discloses an aqueous organic silicon composition containing a lecithin, an alkoxysilane or its condensate, and a water in addition to an optional emulsifier or aqueous resin. The disclosed composition utilizes the alkylalkoxysilane or its condensate. The lecithin and the aqueous material are used as a symmetric material relative to the silane or its condensate. Therefore, the disclosed material is quite different from the inventive material which has a second component of polymethacrylicacidester and which is used in the form of an organic solution.

Japanese patent application Laid-open No. 4-342782 discloses a conventional polishing composition containing a material selected from a group consisting of wax, solvent, viscosity increasing agent, calender agent and emulsifier. Further, the conventional polishing composition contains a film former of sililated polyether containing an at least one kind of polyoxyalkylene block in its molecular structure. The polyoxyalkylene block is coupled to a silicon atom having at least one hydrolytic base through an organic linking radical. The polyoxyalkylene block is selected from a polyoxyethylene and a polyoxypropylene. Further, a detailed structure of the alkylsiloxane contained in the polishing composition is disclosed. However, the disclosed alkylsiloxane is quite different from the inventive compound.

Japanese patent application Laid-open No. 5-112583 discloses a silane compound represented by the following general formula:

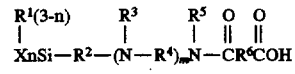

where $R^1$ denotes a hydrocarbon base of single valence, $R^2$, $R^4$ and $R^6$ denote a hydrocarbon base of double valence, $R^3$ and $R^6$ denote a hydrocarbon base of single valence or a hydrogen atom, X denotes a hydrolytic base, m denotes an integer number of 0, 1, 2 or 3, and n denotes an integer number of 1, 2 or 3. Further, there is disclosed an anticloud agent composed mainly of the above noted silane compound and an optional hydrolyzed condensate. However, the disclosed material does not contain a main component of silane compound used in the inventive material. The inventive solution product is certainly adhered to a glass surface, but does not work as an anticloud coating agent.

Japanese patent application Laid-open No. 5-311158 discloses an aqueous composition having a surface water repellancy and containing a certain kind of organosilicon compound. The aqueous composition is composed of an alkyltrialkoxysilane in which an alkyl base of $C_1$–$C_6$ is coupled to a silicon atom, a silane coupling agent, an amino resin, and a fourth ammonium silane. Such a composition is quite different from the inventive liquid composition.

SUMMARY OF THE INVENTION

The inventive composition contains both a silicone oil and a polymethacrylicacidalkyl. The silicone oil is known as one of synthetic oils having the highest stability in a physical chemistry aspect. The polymethacrylicacidalkyl is known and used as a core component of a coating material such as a water repellant agent, an adhesive agent and a polishing agent. However, there is never known a new coating material composed mainly of both the silicone oil and the polymethacrylicacidalkyl. According to a reference 1 ("Silicon and Silicone" pages 87–134, 1990, E. G. Rechow, translated by Shozo MIKI and Masao TSUCHIKAWA, published originally by Springer-Verlag, and reproduced by Springer-Verlag Tokyo K.K.), the silicone oil is rather stable and does not have a good affinity to an adhesive compound. However, the inventor has created a new coating solution which perfectly dissolves therein both of the silicone oil and the polymethacrylicacidalkyl to keep their respective advantages.

As disclosed in the reference 1, at page 94, table 6.5, and page 96, table 6.6, the silicone oil is stable in the physical chemistry aspect. Particularly, the silicone oil is a highly antielectrostatic or insulative oil material, and its viscosity does not vary in a wide temperature range. However, in general, the silicone oil does not have a good affinity to an adhesive compound. On the other hand, the other component of polymethacrylicacidalkyl ester is basically hydrophilic, but has practically valuable features such as water repellancy, adhesiveness, film forming ability and polishing ability. Therefore, the polymethacrylicacidalkyl is generally used as a core component of various coating materials. The silicone oil alone can be easily dissolved into a known solvent. Also, the polymethacrylicacidalkyl alone is easily dissolved into a known solvent. When respective solutions are mixed with each other, the mixture initially appears uniform while containing the diluted silicone oil and the polymethacrylicacidalkyl. However, after a while, the two components are separated from each other in a double layer. In view of this, after intensive study the inventor has discovered a useful buffer solvent (mitigating agent) such as methanol which can commonly dissolve both of the silicone oil solution and the polymethacrylicacidalkyl solution to create a clear and uniform liquid containing the two components. Later, theoretical effect will be discussed for the newly discovered buffer solution. The thus obtained perfect solution containing the silicone oil and the polymethacrylicacidalkyl is suitable for coating materials to impart thereto good water repellancy, good polishing ability and good extensibility.

The inventive coating composition is composed of the silicone oil and the polymethacrylicacidalkyl ester. As described before, the silicone oil is one of the synthetic oils having the highest stability in the physical chemistry behavior. On the other hand, the polymethacrylicacidalkyl ester (hereinafter, referred to as "polymethacrylate") is a core component of the conventional coating material in view of its good extensibility and polishing ability. However, there is never known a new coating material composed both of the silicone oil and the polymethacrylate, because it has been widely recognized that the two components have no mutual affinity with each other. However, the inventor has succeeded in solving the poor mutual affinity of the two components as theoretically and experimentally described hereinafter.

DETAILED DESCRIPTION OF THE INVENTION

First, description is given for the two main components of the inventive material, i.e., silicone oil and polymethacrylicacidalkyl ester. A chemical structure of the silicone oil is disclosed in the reference 1, pages 87–93. According to this reference, the silicone oil is a polymer composed of a chain of monomers dimethylsilicon monooxide (dimethylsiloxane) except for a terminal base. The dimethylsilicon monooxide is represented by the following chemical formula:

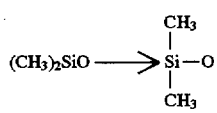

Further, the above formula is modified as follows to represent a polarization effect of functional groups based on molecular bonding or linkage:

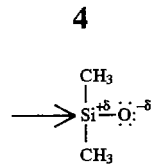

where symbol "+δ" denotes electron donor attribute of Si atom, symbol "−δ" denotes electron acceptor attribute of O atom, and symbol "••" denotes an electron pair in the outermost shell of O atom. The above polarization formula indicates that Si is charged by +δ, while O is charged by −δ. Si atom has an electron donor attribute weaker than that of C atom according to reference 2 ("Organic Chemistry Practice", page 19, 1.12.1978., Hiroshi MINATO, Tokyo Chemical Member K.K.). Therefore, it is expected from the above formula that −δ predominates within a molecule of dimethylsilicon monooxide. The predominancy of −δ in this compound is well observed in a reaction where dimethylsilicon monooxide is attacked by sulfuric acid to produce sulfuric acid ester as taught by reference 1, at page 89. Therefore, the electron donor feature, i.e., −δ feature dominates in the silicone oil composed of a chain of dimethylsilicon monooxide monomers due to total polarization effect of the molecular bonding in the silicone oil. Stated otherwise, it is concluded that the silicone oil is an electrically negative polymer.

Next, description is given for the polymethacrylate. This is a polymer composed of a chain of methacrylate monomers, and is represented by the following chemical formula:

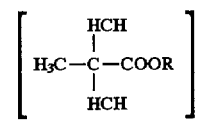

Further, the above formula is modified as follows to represent polarization effect due to molecular linkage:

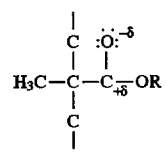

Moreover, a group H₇C₄• represented by the following formula has an electronic stability higher than that of H₃C• represented by the following formula according to reference 3 ("Practice of Organic Chemistry" page 39, 25.2.1994., Akira SUGIMORI, Science Company).

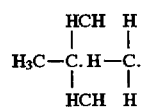

Namely, the H₇C₄• group contained in the methacrylate has an electron donor feature weaker than that of the H₃C• group. Therefore, the −δ factor dominates in the methacrylate over the +δ factor due to the polarization effect. Stated otherwise, it is concluded that the polymethacrylate is also an electrically negative polymer.

According to the above discussion, the silicone oil and the polymethacrylate used as the main components of the inventive composition are both electrically negative due to the polarization effect of the functional group by chemical linkage. This can be experimentally confirmed. For example, a solution A containing the silicone oil and another solution B containing the polymethacrylate are mixed with each other so that solvents of the solutions A and B are uniformly dissolved with each other. However, the silicone oil and the polymethacrylate are separated from each other within the mixed solvents. Namely, the silicone oil and the polymethacrylate have an electric charge of the same polarity so that the two components each other.

Next, detailed description is given for the buffer solution such as methanol and aceticacidmethyl ester, which are a significant ingredient of the inventive liquid composition. The methanol ($CH_3OH$) is a simple alcohol, and has specific features. The methanol is represented by the following formula, in which polarization effect due to molecular bonding is schematically illustrated:

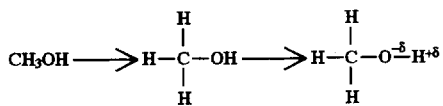

In the above formula, the left side group $H_3C^\bullet$ is unstable and has an electron donor feature. A symbol "•" denotes a radical (See the reference 3, page 39). In view of this, the $+\delta$ factor of the right side is enhanced to thereby predominate over the $-\delta$ factor. This can be readily understood from the following reaction formula:

$2CH_3OH + 2Na \rightarrow 2CH_3ONa + H_2$

Consequently, the $+\delta$ factor dominates in the molecule of methanol due to the polarization effect of the molecular bonding. Stated otherwise, the methanol is an electrically positive molecule.

Further, description is given for the aceticacidmethyl ester ($CH_3COOCH_3$, hereinafter, referred to as "aceticacidmethyl"). This molecule is represented by the following formula which schematically illustrates polarization effect due to molecular bonding:

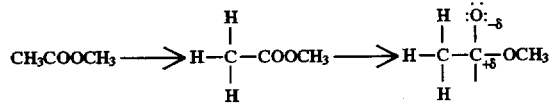

In the above formula, the group $H_3C^\bullet$ at the left side is rather unstable and has an electron donor feature to strengthen the $+\delta$ factor of the central atom C. However, this effect may be moderately weaker than that of methanol. This is experimentally recognized since an effective amount of the aceticacidmethyl is normally greater than that of the methanol. In this case, it should be noted that the aceticacidmethyl is still electrically positive as compared to the polymethacrylate. Namely, the polymethacrylate has a chain structure containing a unit represented by the following formula:

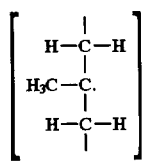

This unit is significantly stable as compared to the methyl radical $H_3C^\bullet$ so that the unit may not so strengthen the $+\delta$ factor of the central atom C. Therefore, the dominancy of the $-\delta$ factor of the atom O may be maintained.

According to the invention, the silicone oil and the polymethacrylate are respectively dissolved into suitable solvents. The thus prepared solutions of the silicone oil and the polymethacrylate are mixed with each other. Then, the methanol or aceticacidmethyl is added to the mixture to thereby form a clear and uniform perfect solution. In this case, though the silicone oil solution and the polymethacrylate solution are not dissolved with each other at all, the methanol or aceticacidmethyl is added as a functional or buffer agent to the mixture of the solutions so that the silicone oil and the polymethacrylate are completely dissolved. Namely, the main components of the silicone oil and the polymethacrylate are both electrically negative due to the polarization effect of the molecular bonding so that their separate solutions are not mutually dissolved with each other. However, the mixture is added with the methanol or the aceticacidmethyl, either of which is electrically positive so that the mixture is turned to the uniform and transparent perfect solution as if alkali and acid are neutralized with each other.

The thus obtained final solution product has a good chemical stability and an excellent water repellancy which are attributed to the silicone oil, and has an excellent extensibility and adhesiveness and a good water resistance which are attributed to the polymethacrylate. Both of the main components can maintain their specific performance, and interact with each other to form a uniform coating film. The inventive solution is readily applied to form a coating film over various objects such as natural fabrics including cotton, silk and wool. The cotton fiber is made from combination of various polysaccharides. The silk and wool fibers are made from combination of various amino acids. These fibers are all electrically positive within the molecule due to the polarization effect of the molecular bonding. On the other hand, the main components of the inventive composition are all electrically negative due to the polarization effect of the molecular bonding. Therefore, the main components are easily adsorbed physically on the fibers. Further, these main components easily penetrate into a body of the fibers. Thus, the inventive solution is effective for the natural fibers as a coating agent. The inventive coating liquid has various effective features such as water repellancy, polishing ability, wettability to achieve deep coloring, and durability.

As discussed above, the aceticacidmethyl has a dominant $+\delta$ feature within the molecule due to the polarization effect of the molecular bonding. Therefore, the aceticacidmethyl is electrically positive. However, it is apparent that the $+\delta$ predominancy of the aceticacidmethyl is slightly weaker than that of the methanol as understood from the experiment described below. Further, according to the inventor's study, tetrachloromethane ($CCl_4$) also has a buffer effect though it is relatively weak. In view of the chemical structure, polarization by molecular linkage is not expected in tetrachloromethane, because the outermost shell of central carbon atom is saturated by electrons. However, it is expected that existence of $H^+$ may cause the following reaction:

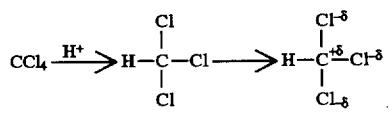

In the produced $HCCl_3$, the electron donor is predominant due to the polarization effect of the molecular bonding within the molecule (See reference 3, page 40). Practically, commercially available agent of $CCl_4$ may contain a trace of $HCCl_3$.

Next, experimental description is given for physical properties of the inventive product. With regard to water repellancy, a paper piece and a leather piece of a given size are dipped into a 20% solution containing one weight part of silicone oil and three weight part of polymethacrylate according to the invention. Then, the paper piece and the leather piece are taken out of the solution and are dried at 25° C. over two hours. The dried pieces are placed in water within a beaker. The paper and leather pieces float on the water for several days without any change. Optionally, a third component may be added to the inventive solution. For example, a polishing agent such as lanolin is added to improve water repellancy and surface smoothness of leather.

With regard to solvents for the two components, generally, hydrocarbon compound of chain structure is used as the solvent for the silicone oil. In the invention, the solvent is selected from turpentine oil, n-decane, heptane, tetrachloroethane, and toluene. On the other hand, generally aliphatic species of hydroxycarbon compound is used as the solvent for the polymethacrylate. In the invention, the solvent is selected from 1.4 dioxane, ethoxyethanol and 2-butanone. Further, according to the invention, the buffer solvent is selected from methanol, aceticacidmethyl, aceticacidethyl and tetrachloromethane other than the main solvents for the silicone oil and the polymethacrylate. These solvents are selected in view of solubility, availability and price.

EXAMPLE 1

Polymethacrylate 4 g is dissolved in 2-butanone 10 cc to form a first solution. Silicone oil 2 g is dissolved in toluene 15 cc to form a second solution. Methanol 6 cc is added to a mixture of the first and second solutions to thereby form a final product of uniform and clear liquid. The liquid is diluted and sprayed over cloth so that the cloth exhibits high water repellancy.

EXAMPLE 2

Polymethacrylate 4.0 g is dissolved in 2-butanone 10 cc to prepare a first solution. Silicone oil 1.0 g is dissolved in tetrachloroethane 15 cc to prepare a second solution. Aceticacidmethyl is added to a mixture of the first and second solutions while shaking so as to form a clear and uniform liquid. A required volume of the aceticacidmethyl is about 13 cc. This liquid may be used likewise the example 1.

EXAMPLE 3

Polymethacrylate 4 g, silicone oil 1 g and lanolin 3 g are dissolved into a mixture of tetrachloromethane 10 cc and 2-butanone 5 cc. Then, tetrachloromethane is added with shaking so as to form a clear and uniform liquid. The required amount of tetrachloromethane is about 18 cc. This uniform and transparent liquid has a thin yellow color tone and a rather heavy viscosity. This liquid is applied to a leather surface of shoes so that the leather has a polished smooth surface.

According to the present invention, preferable composition ratio of silicone oil and polymethacrylate is 0.5–3 weight part/10 weight part. Preferable volume of solvent is 5–20 weight part relative to 1 weight part of the composition. A diluted form of the inventive product is applied to umbrella cloth and coat cloth by spray so as to impart thereto water repellancy and rigidity. The inventive product may be applied to pulp products and clay products to impart thereto polishing feature and wettability. In such a case, a mixture rate of silicone oil is preferably set lower than usual. As described before in conjunction with the examples, the inventive coating solution features the easy productivity with clear and uniform appearance.

What is claimed is:

1. A coating solution comprising:
   an ingredient solute comprised of silicone oil and polymethacrylate;
   a basic solvent selected from a group consisting of turpentine oil, n-decane, heptane, tetrachloroethane, 2-butane, 1,4 dioxane, ethoxyethanol and toluene; and
   a buffer solvent selected from the group consisting of methanol, aceticacidalkyl and tetrachloromethane, the buffer solvent being added to a mixture of the ingredient solute and the basic solvent so that both of the silicone oil and the polymethacrylate are completely dissolved to form a uniform and clear solution.

2. A coating solution according to claim 1; wherein the silicone oil comprises a polymer composed of a chain of monomers of dimethylsilicon monoxide.

3. A coating solution according to claim 1; further comprising lanolin.

4. A method of producing a coating solution for coating a material, comprising the steps of:
   producing a first solution comprising a silicone oil and a first solvent;
   producing a second solution comprising polymethacrylate and a second solvent;
   mixing the first and second solutions to produce a third solution; and
   adding to the third solution a buffer solvent selected from the group consisting of methanol, aceticacidalkyl and tetrachloromethane so that the silicone oil and the polymethacrylate are dissolved.

5. A method for producing a coating solution according to claim 4; wherein the first and second solvents comprise at least one compound selected from the group consisting of turpentine oil, n-decane, heptane, tetrachloroethane, 2-butane, 1,4 dioxane, ethoxyethanol and toluene.

6. A method for producing a coating solution according to claim 4; further comprising the step of adding lanolin.

7. A method for producing a coating solution according to claim 4; wherein the silicone oil comprises a polymer composed of a chain of monomers of dimethylsilicon monoxide.

8. A coating solution comprising:
   a first ingredient solute comprising a silicone oil and a first solvent;
   a second ingredient solute comprising polymethacrylate and a second solvent; and
   a buffer solvent added to a mixture of the first and second ingredient solutes in an amount effective to dissolve the silicone oil and the polymethacrylate to form a uniform and clear solution.

9. A coating solution according to claim 8; wherein the first and second solvents comprise at least one compound selected from the group consisting of turpentine oil, n-decane, heptane, tetrachloroethane, 2-butane, 1,4 dioxane, ethoxyethanol and toluene.

10. A coating solution according to claim 8; wherein the silicone oil comprises a polymer composed of a chain of monomers of dimethylsilicon monoxide.

11. A coating solution according to claim 8; further comprising lanolin.

12. A coating solution according to claim 8; wherein the buffer solvent comprises a compound selected from the group consisting of methanol, aceticacidalkyl and tetrachloromethane.

13. A method of coating a material, comprising the steps of:

provinding a material to be coated; and applying a coating solution to a surface of the material; wherein the coating solution comprises a first ingredient solute comprising a silicone oil and a first solvent, a second ingredient solute comprising polymethacrylate and a second solvent, and a buffer solvent added to a mixture of the first and second ingredient solutes in an amount effective to dissolve the silicone oil and the polymethacrylate to form a uniform and clear solution.

14. A method of coating a material according to claim 13; wherein the material comprises a fabric.

15. A method of coating a material according to claim 14; wherein the fabric is selected from the group consisting of cotton, wool and silk.

16. A method of coating a material according to claim 13; wherein the step of applying a coating solution to a surface of the material comprises the step of spraying the solution onto the material surface.

* * * * *